United States Patent Office 2,888,411
Patented May 26, 1959

2,888,411

PREPARATION OF FLEXIBLE ELASTOMERIC POLYURETHANE CELLULAR MATERIALS

Henry A. Pace, Akron, Ohio, assignor to The Goodyear Tire & Rubber Company, Akron, Ohio, a corporation of Ohio No Drawing. Application September 1, 1955
Serial No. 532,109

6 Claims. (Cl. 260—2.5)

This invention relates to the preparation of flexible elastomeric cellular materials. More particularly, it relates to methods for preparing flexible elastomeric cellular structures formed from liquid reaction mixtures containing polyisocyanates and to improved products obtained by the use of these methods.

The production of flexible elastomeric cellular structures from liquid polymeric reaction mixtures containing polyisocyanates is a relatively recent development. The reaction mixtures from which the cellular structures are made contain polymeric materials which are either liquid at room temperature or capable of being melted at relatively low temperatures. These polymeric materials contain active-hydrogen atoms which react with the isocyanate groups to extend the molecular chains. The polyisocyanate reactant performs a three-fold function in the reaction mixture. It operates to chain-extend the polymeric material, to react with water to generate carbon dioxide gas, and to cross-link or cure the polymeric material. The liberated carbon dioxide produces a foamed mixture which sets to an elastomeric flexible cellular structure after curing.

It is the broad object of this invention to improve the physical properties of flexible elastomeric cellular structures formed from the reaction of an active-hydrogen-containing polymeric material, polyisocyanate and water. Another object is to provide consistently uniform, high quality products from these reaction mixtures. It is also an object to provide an improved catalytic system for the foaming and curing of reaction mixtures containing an active-hydrogen-containing polymeric material, polyisocyanate and water. Still another object is to provide a control over the generation of gas in the reaction mixture. Other objects will appear as the description proceeds.

The objects of this invention are accomplished by first preparing a prepolymer from an active-hydrogen-containing polymeric material of specified molecular weight and acid number and a controlled amount of a diisocyanate, permitting the reaction between these materials to continue until substantially all of the exothermic heat of reaction has been generated and dissipated and then adding certain catalysts along with polyisocyanate and water to the prepolymer in order to provide the cure for and the generation of gas in the reaction mixture.

By the term "active-hydrogen" used to describe the type of polymeric materials useful in the practice of this invention is meant those hydrogen atoms which are reactive as measured and determined by the Zerewitinoff method. Examples of active-hydrogen-containing polymeric materials which are useful in the practice of this invention are polyesters, polyesteramides, and polyalkylene ether glycols.

The polyesters referred to are prepared by a condensation reaction between one or more glycols and one or more dibasic carboxylic acids. The polyesteramides employed are prepared from one or more glycols, one or more dibasic carboxylic acids and relatively small amounts of one or more bifunctional amino compounds such as amino carboxylic acids, amino alcohols, and diamines. Small amounts of trifunctional materials in addition to the bifunctional compound, may be employed in preparing the active-hydrogen-containing polyesters and polyesteramides.

Any dibasic carboxylic acid, preferably those whose carboxyl groups are attached to terminal carbons, may be used to form the polyester or polyesteramide, including succinic, glutaric, adipic, pimelic, suberic, azelaic, sebacic, malonic, brassylic, tartaric, maleic, malic, fumaric, dilinoleic, thiodibutyric, diphenic, isophthalic, terephthalic, hexahydroterephthalic, p-phenylene diacetic, dihydromuconic, and beta-methyladipic acids.

Any glycol may be used in the formation of the polyester including ethylene, propylene 1,2; propylene 1,3; diethylene, triethylene, butylene, pentamethylene, hexamethylene, decamethylene, dodecamethylene, and N,N-diethanolaniline, glycerine mono ethers, and thiodiglycol.

Any amino alcohol having at least one hydrogen atom attached to the amino nitrogen atom may be employed including ethanolamine, 3 amino-propanol, 4 amino-butanol, 6 amino-hexanol, and 10 amino-decanol.

Examples of the diamines which may be used are ethylene, propylene 1,2; tetramethylene 1,4; hexamethylene 1,6; decamethylene 1,10; piperazine, isopropyl amino propyl amine, and 3,3' diamino dipropyl ether. Listed below are the reactants which are used to form particular polyesters and polyesteramides:

(1) Ethylene glycol plus adipic acid.
(2) Propylene glycol 1,2 plus adipic acid.
(3) Ethylene glycol (80 mol percent) propylene glycol 1,2 (20 mol percent) plus adipic acid.
(4) Ethylene glycol (80 mol percent) propylene glycol 1,2 (20 mol percent) plus azelaic acid.
(5) Ethylene glycol (80 mol percent), propylene glycol 1,2 (20 mol percent) plus sebacic acid.
(6) Ethylene glycol (80 mol percent), propylene glycol 1,2 (20 mol percent) plus dilinoleic acid (20 mol percent), adipic acid (80 mol percent).
(7) Ethylene glycol (80 mol percent), glycerine monoethyl ether (20 mol percent) plus adipic acid.
(8) Ethylene glycol (80 mol percent), butylene glycol 1,4 (20 mol percent) plus adipic acid.
(9) Ethylene glycol (80 mol percent), propylene glycol 1,3 (20 mol percent) plus adipic acid.
(10) Ethylene glycol (80 mol percent), pentane diol 1,5 (20 mol percent) plus adipic acid.
(11) Ethylene glycol (80 mol percent) glycerine monoisopropyl ether (20 mol percent) plus adipic acid.
(12) Ethylene glycol (80 mol percent), propylene glycol 1,2 (from 18 to 5 mol percent), ethanol amine (from 2 to 15 mol percent) plus adipic acid.
(13) Ethylene glycol (80 mol percent), propylene glycol 1,2 (20 mol percent) plus maleic acid (from 3 to 6 mol percent), adipic acid (from 97 to 94 mol percent).
(14) Ethylene glycol (80 mol percent) propylene glycol 1,2 (from 19 to 17 mol percent), piperazine (from 1 to 3 mol percent) plus adipic acid.
(15) Ethylene glycol (80 mol percent), propylene glycol 1,3 (from 18 to 5 mol percent), dihydroxyethyl aniline (from 2 to 15 mol percent) plus adipic acid.
(16) Ethylene glycol (80 mol percent), butylene glycol 1,4 (20 mol percent) plus adipic acid.
(17) Ethylene glycol (80 mol percent), diethylene glycol (20 mol percent) plus adipic acid.
(18) Ethylene glycol (from 90 to 10 mol percent) propylene glycol 1,2 (from 10 to 90 mol percent) plus adipic acid.
(19) Ethylene glycol (from 90 to 10 mol percent), propylene glycol 1,2 (from 10 to 90 mol percent) plus azelaic acid.

The polyalkylene ether glycols which may be used are hydroxyl-terminated polyethers derived from alkylene oxides or glycols or from other heterocyclic ethers, such as dioxolane. Further examples of these active-hydrogen-containing polymeric materials and methods for their preparation are described in United States Patents 2,625,531, 2,625,532, and 2,625,535 which show polyesters and polyesteramides and United States Patents 2,692,873 and 2,702,797 which show polyalkylene ether glycols such as the polyethylene ether glycols, the polypropylene ether glycols and the polybutylene ether glycols.

The practice of this invention is directed to active-hydrogen-containing polymeric materials which have an average molecular weight of from 750 to 2,250 and, in addition, in the case of polyesters and polyesteramides, an acid number not greater than 5. This molecular weight range corresponds to active-hydrogen-containing polymeric materials which have a reactive number (the sum of the hydroxyl number and the acid number) of from approximately 50 to 150. It is preferred to employ an active-hydrogen-containing polymeric material which has a reactive number of approximately 60, an acid number not greater than 2 and a corresponding approximate average molecular weight of 1900. Since water is reactive with the diisocyanate employed to form the prepolymer, the active-hydrogen-containing polymeric material should be substantially anhydrous and contain not more and preferably less than 0.2% water by weight.

The preparation of the prepolymer employed in the practice of this invention has been described in my co-pending application Serial Number 508,323, filed May 13, 1955. Any diisocyanate or mixtures of diisocyanate may be employed in the formation of the prepolymer. Representative examples of these diisocyanates are hexamethylene diisocyanate; para-phenylene diisocyanate; meta-phenylene diisocyanate; 4,4'-diphenyl diisocyanate; 1,5-naphthalene diisocyanate; 4,4'-diphenylene methane diisocyanate; 4,4'-diphenyl ether diisocyanate; 3,3'-dimethyl 4,4'-diphenyl diisocyanate; and 3,3'-dimethoxy 4,4'-diphenyl diisocyanate. The preferred diisocyanates are the tolylene diisocyanates which are liquid at room temperature.

In preparing the prepolymer, the diisocyanate should be employed in a range from 0.90 to 1.10 mols per mol of active-hydrogen-containing polymeric material. If less than 0.90 mol of diisocyanate are employed, it has been observed that the finished product shows a tendency to shrink from the dimensions of the mold in which it is cast. If more than 1.10 mols of diisocyanate are employed, it has been observed that the finished products are relatively coarse in structure and are also subject to internal collapse of the cell structure.

To prepare the prepolymer employed in the practice of this invention, the active-hydrogen-containing polymeric material of specified average molecular weight and acid number is reacted with the above-indicated proportion of diisocyanate until the exothermic heat of reaction has been in large part generated and removed from the system. While this reaction can be accomplished at temperatures ranging from room temperature to 100° C. and times ranging from 20 minutes to 2 hours, it is preferred to prepare the prepolymer by causing the reaction to proceed for from 20 minutes to 1 hour at temperatures between 50° C. and 70° C. Best results are obtained by reacting the diisocyanate with the active-hydrogen-containing polymeric material at approximately 60° C. for approximately 30 minutes. The amount of the available exothermic heat which must be generated and removed from the prepolymer system in order to achieve the objects of this invention can best be determined by comparing the internal or reaction temperature with the external or bath temperature. As the exothermic heat of reaction is generated, the reaction temperature gradually rises above the bath temperature until a maximum temperature, in the range of from 2 to 15 degrees above the bath temperature, is reached. The reaction temperature then slowly drops off. At the point when the reaction temperature reaches a maximum and begins to drop off, sufficient exothermic heat has been generated to produce the desired beneficial effect upon the finished product achieved by the preparation of the prepolymer.

The prepolymer prepared as described above should be cooled if necessary to room temperature after the exothermic heat has been evolved since the reaction between the diisocyanate and the polymeric material continues, although at a reduced rate. If the prepolymer is to be used immediately in the formation of the desired flexible cellular material, no particular precautions need be taken in regard to the storing of the prepolymer. However, if the prepolymer is to be kept for as much as several days before it is used, it should be stored under cool, anhydrous conditions in order to preserve the stability of the prepolymer against increase in viscosity.

According to the practice of this invention, the prepolymer prepared in the manner described is processed into the finished cellular structure by adding to the prepolymer the polyisocyanate, water and two specific catalysts, and permitting the complete reaction mixture to foam and cure. The foaming and gelation or cure of the reaction mixture will take place at room temperature, although it is preferred to operate at temperatures between 50° and 60° C. for approximately 15 to 20 minutes, followed by a subsequent heat treatment of from 30 to 60 minutes at 80° to 100° C. after which the cellular structure can be removed from the mold or casting surface without distortion. After this heat treatment the cellular material is completely cured, eliminating the necessity for aging at room temperature in order to attain the ultimate in physical properties.

The first of the catalysts employed in the practice of this invention is a condensation product of approximately 4 mols of butyraldehyde and 1 mol of aniline. These condensation products and methods for their preparation are described in The Journal of American Chemical Society, vol. 70, p. 1624, for April 1948. The amount of this catalyst added to the reaction mixture is not critical. It has been found that from 0.5 to 1.5% by weight of the catalyst based upon the weight of the prepolymer is effective for the purpose of this invention and that approximately 0.8% gives optimum results.

The second catalyst to be added to the reaction mixture is N-methylmorpholine, the amount of which can be varied from 0.25 to 1.00 cubic centimeter per 100 grams of prepolymer. Particularly effective results are achieved by employing approximately 0.5 cubic centimeter of N-methylmorpholine per 100 grams of prepolymer.

The other essential ingredients required to form a flexible, elastomeric, cellular product from the prepolymer are the polyisocyanate and water, the amounts of which can be varied depending upon the desired density of the finished cellular material. In general from 1 to 3 mols of a diisocyanate per mol of the prepolymer and from 1 to 4% water by weight of the prepolymer are employed to produce the desired cellular structures, with higher amounts of water and diisocyanate being employed to produce cellular structures of lower density.

The sequence of adding the catalysts, the polyisocyanates and the water to the prepolymer is not critical although best results are obtained if the polyisocyanate is added first, the butyraldehyde/aniline condensation product second, the water third, and the N-methylmorpholine last with a rapid mixing of each added ingredient with the prepolymer before the next ingredient is added. By adding the ingredients in this manner, the carbon dioxide formation is delayed until a thorough blending of the reaction mixture can be accomplished.

The practice of this invention is further illustrated with reference to the following examples in which, unless otherwise specified, parts are shown by weight. These examples are to be interpreted as representative rather than restrictive of the scope of this invention.

Example 1

A polyester was prepared from the condensation reaction between adipic acid and approximately equal molecular amounts of ethylene glycol, diethylene glycol, and butylene glycol. The polyester had a hydroxyl number of 60 and an acid number of 2. This polyester (700 parts) was mixed with 68 parts of tolylene diisocyanate. This reaction mixture was stirred in a closed flask at a water bath temperature of 60° C. for approximately 35 minutes during which time the reaction temperature rose to approximately 65° C. after 13 minutes and subsequently fell off to 63° C. after 35 minutes. The prepolymer resulting from this reaction was cooled to room temperature and mixed with 220 parts of tolylene diisocyanate. A second reaction mixture was prepared containing 100 parts of the polyester described above, 30.5 parts of water, 5.1 parts of N-methylmorpholine, 0.35 part of a wetting agent, an alkylated aryl polyether alcohol and 9.3 parts of the condensation product of approximately 4 mols of butyraldehyde and 1 mol of aniline. The prepolymer solution containing the added tolylene diisocyanate (100 parts) was mixed with 11.4 parts of the polyester solution containing the water and accelerators. The complete reaction mixture was mixed by hand for approximately ½ minute and poured into a mold. The reaction mixture immediately began to foam and was cured for 20 minutes at 60° C. followed by 1 hour at 100° C. The cured flexible cellular product was of excellent quality in appearance and physical properties. It had a density of 3.9 pounds per cubic foot, a tensile strength of 41 pounds per square inch, an elongation of 556% at break, and an RMA compression of 53 pounds. This compression test is a measure of the pounds required to compress 50 square inches of the foamed structure to 75% of its original height. The method for conducting this test is described on page 2 of the Rubber Manufacturers Association Buyer's Specification for Latex, dated April 1, 1953.

Example 2

To 100 grams of the prepolymer prepared as described in Example 1 were added 17.9 grams of tolylene diisocyanate. The resulting mixture was hand stirred for two minutes after which 0.84 grams of a condensation product of approximately 4 mols of butyraldehyde and 1 mol of aniline was added. This mixture was stirred for an additional two minutes after which 1.83 grams of water were added. After an additional one minute stirring 0.5 cubic centimeter of N-methylmorpholine was added. The complete reaction mixture was stirred for an additional 30 seconds after which it was immediately poured into a mold and cured for 20 minutes at 55° C. followed by 1 hour at 100° C. The cured flexible reaction product was of excellent quality both from the appearance and physical property standpoints. It had a density of 6.8 pounds per cubic foot, a tensile strength of 38 pounds per square inch, an elongation of 286% at break and an RMA compression of 100 pounds.

Example 3

The same procedure was followed as in Example 2 except that 2.75 grams of water was employed in place of 1.83 grams of water. A cured foamed structure of excellent quality in both appearance and physical properties was produced. It had a density of 5.3 pounds per cubic foot, a tensile strength of 33 pounds per square inch, an elongation of 310% at break and an RMA compression of 72 pounds.

Example 4

The same procedure was followed as described in Example 2 except 22.4 grams of tolylene diisocyanate and 2.75 grams of water were employed. The cured material was of excellent quality both in appearance and physical properties. It had a density of 4.7 pounds per cubic foot, a tensile strength of 32 pounds per square inch, an elongation of 359% at break, and an RMA compression of 63 pounds.

Example 5

A polyester was prepared from the condensation reaction between diethylene glycol, and 70 mol percent of adipic acid, and 30 mol percent of suberic acid. The polyester had a hydroxyl number of 62.5 and an acid number of 1.6. This polyester (700 parts) was mixed with 69.3 parts of tolylene diisocyanate. This reaction mixture was stirred in a closed flask at a water bath temperature of 60° C. for approximately 35 minutes during which time the reaction temperature rose to approximately 65° C. after 18 minutes and subsequently fell off to 63.8° C. after 35 minutes. The prepolymer resulting from this reaction was cooled to room temperature and 100 grams thereof were mixed with 17.9 grams of tolylene diisocyanate. The resulting mixture was stirred for 2 minutes after which 0.84 gram of a condensation product of approximately 4 mols of butyraldehyde and 1 mol of aniline was added. This mixture was stirred for an additional 2 minutes after which 1.83 grams of water were added. After an additional 1 minute stirring 0.5 cubic centimeter of N-methylmorpholine was added. The complete reaction mixture was stirred for an additional 30 seconds after which it was immediately poured into a mold and cured for 20 minutes at 55° C. followed by 1 hour at 100° C. The cured flexible reaction produce was of excellent quality both from appearance and physical property standpoints. It had a density of 6.9 pounds per cubic foot, a tensile strength of 33 pounds per square inch, an elongation of 340% at break, and an RMA compression of 93 pounds.

Example 6

The same procedure was followed as in Example 5 except that 2.7 grams of water were employed in place of 1.3 grams of water. A cured foamed structure of excellent quality in both appearance and physical properties was produced. It has a density of 5.4 pounds per cubic foot, a tensile strength of 39 pounds per square inch, an elongation of 410% at break, and an RMA compression of 73 pounds.

Example 7

The same procedure was followed as described in Example 5 except that 22.4 grams of tolylene diisocyanate and 2.75 grams of water were employed. The cured material was of excellent quality in both appearance and physical properties. It had a density of 4.6 pounds per cubic foot, a tensile strength of 35 pounds per square inch, an elongation of 305% at break, and an RMA compression of 63 pounds.

In all of the cured flexible, elastomeric cellular products produced according to Examples 1 through 7 little or no shrinkage occurred. The dimensions of the cured molded products measured substantially the same as the dimensions of the mold in which they were cast. In addition there was no evidence of collapse of the internal cellular structure of the cured materials. In other examples where no prepolymer was formed and no catalysts employed, the cured material was subject to severe shrinkage and collapse.

It will, thus, be seen that by first preparing the prepolymer described above and foaming and curing the prepolymer in the presence of the catalyst combination indicated, it is possible to produce uniform flexible cellular reaction products which are not subject to shrinkage and collapse.

While certain representative embodiments and details have been shown for the purpose of illustrating the invention, it will be apparent to those skilled in this art that various changes and modifications may be made therein

I claim:

1. The process of preparing flexible cellular products which comprises forming a prepolymer by reacting (A) an active-hydrogen-containing polymeric material having an average molecular weight of from 750 to 2,250 and selected from the group consisting of polyalkylene ether glycols, polyesters prepared from at least one dicarboxylic acid and at least one glycol and polyesteramides prepared from at least one dicarboxylic acid, at least one glycol and at least one bifunctional amino compound selected from the group consisting of amino carboxylic acids, amino alcohols and diamines, said polyesters and polyesteramides having an acid number not greater than 5 with (B) from 0.90 to 1.10 mols of an organic diisocyanate per mol of said polymeric material until the exothermic heat of reaction has been substantially completely evolved, removing the generated heat of reaction, adding, in the following sequence, from 1 to 3 mols of an organic diisocyanate per mol of the prepolymer, from 0.5 to 1.5% by weight of said prepolymer of a condensation product of approximately 4 mols of butyraldehyde and one mol of aniline, from 1 to 4% water by weight of the prepolymer and from 0.24 to 0.95% N-methyl morpholine by weight of the prepolymer, thoroughly mixing the reaction mixture after each ingredient is added and permitting the reaction mixture to expand and cure.

2. The process defined by claim 1 in which the diisocyanate employed to form the prepolymer and added to the prepolymer is tolylene diisocyanate.

3. The process defined by claim 2 in which the prepolymer is prepared by heating the active-hydrogen-containing polymeric material with the diisocyanate for approximately 30 minutes at 60° C. and in which the complete reaction mixture is cured first for approximately 15 minutes at 50 to 60° C. and then for approximately 1 hour at 100° C.

4. The process of preparing flexible cellular products which comprises forming a prepolymer by reacting (A) an active-hydrogen-containing polymeric material having an average molecular weight of from 750 to 2,250 and selected from the group consisting of polyalkylene ether glycols, polyesters prepared from at least one dicarboxylic acid and at least one glycol and polyesteramides prepared from at least one dicarboxylic acid, at least one glycol and at least one bifunctional amino compound selected from the group consisting of amino carboxylic acids, amino alcohols and diamines, said polyesters and polyesteramides having an acid number not greater than 5 with (B) from 0.90 to 1.10 mols of an organic diisocyanate per mol of said polymeric material until the exothermic heat of reaction has been substantially completely evolved, removing the generated heat of reaction, adding from 1 to 4% water by weight of said prepolymer, from 1 to 3 mols of an organic diisocyanate per mol of prepolymer, from 0.24 to 0.95% N-methyl morpholine by weight of said prepolymer and from 0.5 to 1.5% by weight of said prepolymer of a condenstion product of approximately 4 mols of butyraldehyde and 1 mol of aniline to said prepolymer, thoroughly mixing the complete reaction mixture and permitting the reaction mixture to expand and cure.

5. The process defined by claim 4 in which the diisocyanate employed to form the prepolymer and added to the prepolymer is tolylene diisocyanate.

6. The process defined by claim 5 in which the prepolymer is prepared by heating the active-hydrogen-containing polymeric material with the diisocyanate for approximately 30 minutes at 60° C. and in which the complete reaction mixture is cured first for approximately 15 minutes at 50 to 60° C. and then for approximately 1 hour at 100° C.

References Cited in the file of this patent

UNITED STATES PATENTS

| | | |
|---|---|---|
| 1,780,326 | Williams et al. | Nov. 4, 1930 |
| 1,780,334 | Burnett et al. | Nov. 4, 1930 |
| 2,621,166 | Schmidt et al. | Dec. 9, 1952 |

FOREIGN PATENTS

| | | |
|---|---|---|
| 712,053 | Great Britain | July 14, 1954 |

OTHER REFERENCES

Dupont Rubber Chemicals Report 43–1, February 1943, "Accelerator 808." Pages 17 and 18.

Heiss et al.: "Industrial & Engineering Chemistry," volume 46, No. 7, July 1954, pages 1498 to 1503.

White: "The Journal of the Society of Dyers and Colourists," volume 70, No. 11, November 1954, pages 481 to 486.